H. P. DODGE & C. M. FOSTER.
AUTOMOBILE GEAR.
APPLICATION FILED MAR. 29, 1909.

943,240.

Patented Dec. 14, 1909.
2 SHEETS—SHEET 1.

WITNESSES:
D. C. Walter
Leona Kiburtz

INVENTORS.
Henry P. Dodge
Cassius M. Foster
J. Henon Hall Their Atty.

H. P. DODGE & C. M. FOSTER.
AUTOMOBILE GEAR.
APPLICATION FILED MAR. 29, 1909.
943,240.
Patented Dec. 14, 1909.
2 SHEETS—SHEET 2.
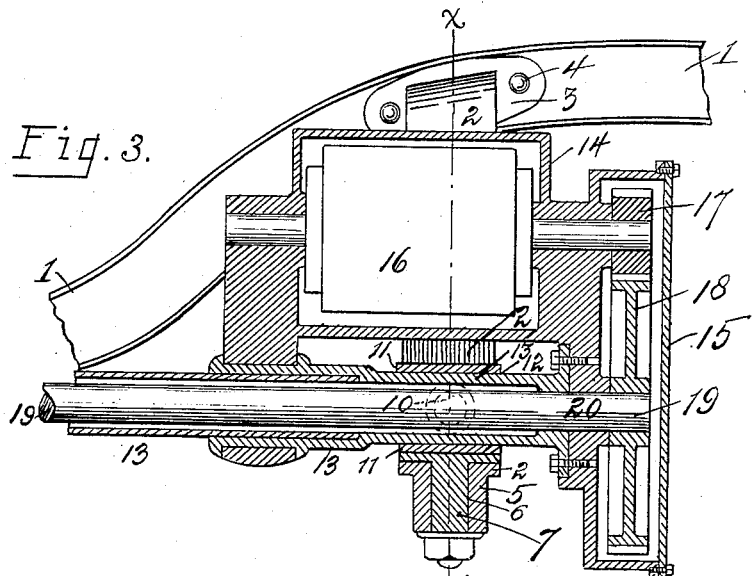
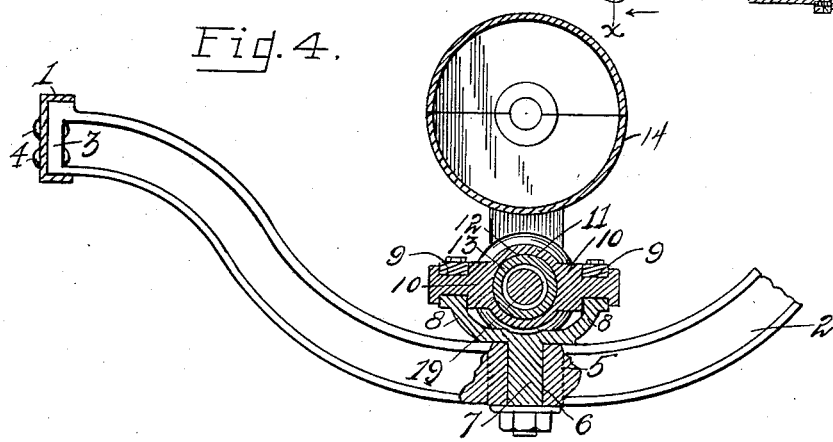
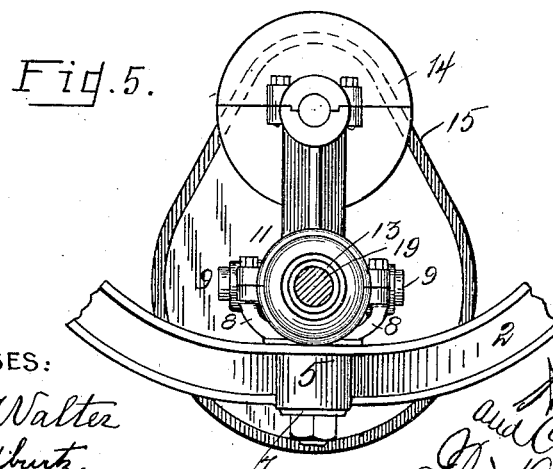
WITNESSES:
D. C. Walter
Leona Skibrutz
INVENTORS:
Henry P. Dodge
and Cassius M. Foster,
By Simon Hall their Atty.

UNITED STATES PATENT OFFICE.

HENRY P. DODGE AND CASSIUS M. FOSTER, OF TOLEDO, OHIO.

AUTOMOBILE-GEAR.

943,240.

Specification of Letters Patent. Patented Dec. 14, 1909.

Application filed March 29, 1909. Serial No. 486,366.

*To all whom it may concern:*

Be it known that we, HENRY P. DODGE and CASSIUS M. FOSTER, citizens of the United States, residing at Toledo, in the county of Lucas and State of Ohio, have invented certain new and useful Improvements in Automobile-Gear; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in automobile-gear, and, more particularly, to the gear of electrically propelled vehicles. Its objects are to furnish a support for the motor and driving mechanism in which their weight shall fall upon the vehicle springs independently of the rear axle and which shall preserve the alinement of these parts with the rear axle and the driven mechanism; to largely relieve the motor and gears from undue shocks, strains and jars, and to provide a construction by which the driving and driven mechanisms preserve their proper operative relation, regardless of the inequalities or roughness of the road and the swaying of the vehicle.

The object of our device, more specifically, is to suspend the driving mechanism from the body of the vehicle by means of a drop cross-beam beneath the bottom of the carriage, the motor and the driving mechanism being connected with and supported by said cross-beam by means of an "universal" joint; also to connect the driving mechanism with the driven rear axle of the vehicle in such fashion that the driving connections are not disturbed by the vertical or lateral movements of either or any or all of the four supporting wheels of the vehicle. We attain these objects by means of the devices and arrangement of parts hereinafter described, and shown and illustrated in the accompanying drawings, in which—

Figure 1:
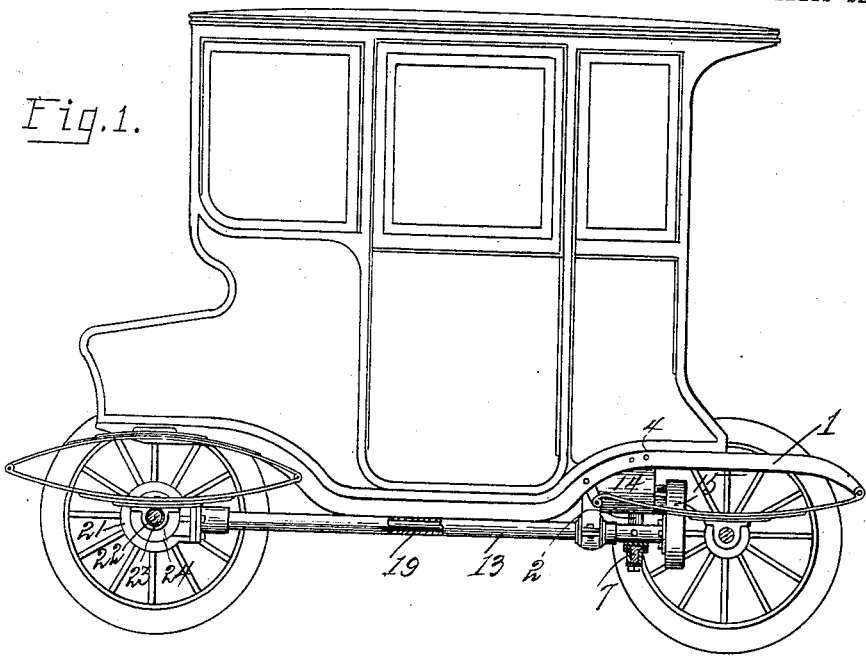
Figure 2:
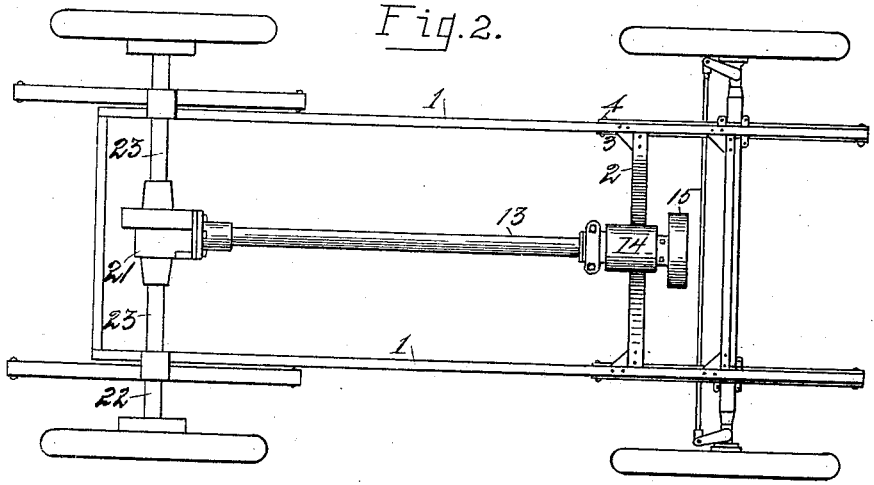

Figure 1 is a side-elevation of an electric carriage provided with our device, the supporting wheels next to the observer being removed, and portions of the structure being shown in section; Fig. 2 a top-plan view of the chassis of an electric carriage provided with our device; Fig. 3 a central, longitudinal, vertical, sectional elevation of our driving mechanism and its supports, on an enlarged scale; Fig. 4 a sectional elevation of the same taken on line X—X Fig. 3, and Fig. 5 a rear view of the same.

Corresponding numerals indicate like parts throughout the drawings.

In the drawings, 1—1 are the side-bars upon which the body of the vehicle rests and is secured, these bars being depressed or dropped intermediate their ends, as shown. The side-bars are suitably connected at their front and rear ends by cross-braces or by the bottom of the body itself. The side members 1—1 are supported at their front and rear ends upon the vehicle-springs in the usual or any preferred manner, which springs are, in turn, supported upon the front and rear axles of the vehicle in the usual or any preferred manner.

2 is a stout bar downwardly curved at its middle, the flanged extremities, —3,— of the bar being secured, as at 4, to the inner sides of the forward elevated portions of the side-bars 1.

Midway of its length the cross-bar 2 is enlarged transversely, as at 5, and through this enlarged portion is a vertical bore or socket 6 in which is swiveled a short vertical shaft 7, having at its top oppositely spread transverse arms 8. In or on the upper ends of the arms 8 are journaled, as at 9, trunnions 10 formed upon and projecting horizontally from opposite sides of sleeve or journal-box 11. In this sleeve or journal-box is journaled, as at 12, a tube or sleeve 13. This sleeve 13, the motor-case 14, and the gear-case 15 are all rigidly connected together and are supported upon the cross-bar 2 through the pivotal joints 6—7, 8—9— 10, and 11—12—13.

Operatively mounted in the motor-case,— in the usual or any preferred manner,—is an electric motor, indicated at 16, the shaft of which carries a pinion 17 engaged with gear 18 on countershaft 19. This shaft is, at its forward end, journaled in the gearing-case, as at 20, and is supported within and concentrically with the sleeve 13. Shaft 19 drives the differential gear.

The sleeve 13 extends rearwardly horizontally to and is rigidly connected with the casing 21 for the differential gear which drives the rear axle 22. This axle is incased with tubes 23—23 rigidly connected at their inner ends with the differential gear casing and at their outer ends with the bearings 24 for the rear axle.

It will now be seen that the motor-casing, the transmission-gear casing, the counter-shaft casing, the differential gear casing, and the rear driving-shaft casing are all rigidly connected together as a single member, and that the motor, the transmission-gear, the counter-shaft, the differential gear, and the rear driving-shaft are, respectively, housed and operatively mounted and supported therein. It will also be seen that the forward part of the assembled casing is supported solely by the cross-bar 2, and that upon this cross-bar the casing is, by means of the "universal" joints 6—7, 8—9—10, and 11—12—13, above described, held in operative alinement with the differential gear and the rear driving shaft, regardless of the longitudinal, transverse or diagonal tilting or swaying of the carriage-body or the carriage-truck.

Having described our invention, what we claim and desire to secure by Letters Patent is,—

1. An automobile gear comprising a motor, a rear axle, driving connections intermediate said motor and axle, casings for said motor, axle and connections, said several casings being rigidly connected as a unitary structure, side-bars, a downwardly bent cross-bar bridged between the side-bars, and an universal joint which supports the forward end of said connected casings upon the cross-bar.

2. In an automobile-gear, a transverse bar, a vertical shaft journaled on said bar and having at its top oppositely transversely spread arms, a sleeve having trunnions journaled upon said arms, another sleeve journaled in the sleeve first mentioned, a driving mechanism, a casing therefor, said casing being rigidly connected with said other sleeve, a driven mechanism, and operative connections intermediate said two mechanisms.

In testimony whereof we affix our signatures in presence of two witnesses.
   HENRY P. DODGE.
   CASSIUS M. FOSTER.

Witnesses:
 M. M. HAYES,
 F. A. CLARK.